United States Patent
Valentine et al.

(10) Patent No.: US 7,340,536 B2
(45) Date of Patent: Mar. 4, 2008

(54) METHOD AND APPARATUS FOR DETERMINING UNMANAGED NETWORK DEVICES IN THE TOPOLOGY OF A NETWORK

(75) Inventors: Simon Peter Valentine, Hemel Hempstead (GB); Christopher Robert Linzell, St. Albans (GB); Peter Wai Lam, Maidenhead (GB); Andrew Peter White, St. Albans (GB)

(73) Assignee: 3Com Corporation, Marlborough, MA (US)

( * ) Notice: Subject to any disclaimer, the term of this patent is extended or adjusted under 35 U.S.C. 154(b) by 537 days.

(21) Appl. No.: 10/054,422

(22) Filed: Jan. 22, 2002

(65) Prior Publication Data

US 2003/0014548 A1    Jan. 16, 2003

(30) Foreign Application Priority Data

Jun. 27, 2001    (GB)    ................................ 0115703.1

(51) Int. Cl.
*G06F 15/16*    (2006.01)
*G06F 15/173*    (2006.01)

(52) U.S. Cl. ....................................... 709/252; 709/223

(58) Field of Classification Search ................ 709/252, 709/223, 224

See application file for complete search history.

(56) References Cited

U.S. PATENT DOCUMENTS

| | | | | |
|---|---|---|---|---|
| 5,276,789 A * | 1/1994 | Besaw et al. | ................. | 345/440 |
| 5,297,138 A * | 3/1994 | Black | ......................... | 370/254 |
| 5,319,644 A * | 6/1994 | Liang | ......................... | 370/452 |
| 5,706,440 A * | 1/1998 | Compliment et al. | ....... | 709/224 |
| 5,708,772 A * | 1/1998 | Zeldin et al. | ................. | 714/25 |
| 5,727,157 A * | 3/1998 | Orr et al. | .................... | 709/224 |
| 5,964,837 A * | 10/1999 | Chao et al. | ................. | 709/224 |
| 6,097,727 A * | 8/2000 | Peters | ......................... | 370/400 |
| 6,108,702 A * | 8/2000 | Wood | ......................... | 709/224 |
| 6,205,122 B1 * | 3/2001 | Sharon et al. | ............... | 370/254 |
| 6,289,375 B1 * | 9/2001 | Knight et al. | ................ | 709/217 |
| 6,377,987 B1 * | 4/2002 | Kracht | ....................... | 709/220 |
| 6,405,248 B1 * | 6/2002 | Wood | ......................... | 709/223 |
| 6,411,997 B1 * | 6/2002 | Dawes et al. | ................ | 709/224 |
| 6,516,345 B1 * | 2/2003 | Kracht | ....................... | 709/220 |
| 6,587,440 B1 * | 7/2003 | Dawes | ........................ | 370/255 |

(Continued)

FOREIGN PATENT DOCUMENTS

EP    0 849 974    6/1998

OTHER PUBLICATIONS

Microsoft Computer Dictionary, 2002, Microsoft Press, Fifth Edition, p. 193.*

*Primary Examiner*—William Vaughn
*Assistant Examiner*—Kristie Shingles

(57)    ABSTRACT

A network management apparatus and method for determining the topology of a network 1 is described. The present invention uses data relating to discovered devices on the network 1, typically network management address table data, to build a network tree. Due to the presence of unsupported or unmanaged connecting network devices, some branches of the resulting tree may not be resolved. In order to address this, for each unresolved branch of the network tree, the present invention attempts to determine the type of each of the discovered network devices on the branch, and if the type of every discovered network device on the branch is determined to be an endstation type, the present invention determines that an undiscovered connecting device is present on the branch.

10 Claims, 3 Drawing Sheets

U.S. PATENT DOCUMENTS

| | | | |
|---|---|---|---|
| 6,697,338 B1 * | 2/2004 | Breitbart et al. | 370/254 |
| 6,826,158 B2 * | 11/2004 | Seaman et al. | 370/254 |
| 6,845,091 B2 * | 1/2005 | Ogier et al. | 370/338 |
| 6,976,087 B1 * | 12/2005 | Westfall et al. | 709/238 |
| 6,980,233 B1 * | 12/2005 | Hirasawa | 348/207.1 |
| 2002/0124079 A1 * | 9/2002 | Pulsipher | 709/224 |
| 2005/0030955 A1 * | 2/2005 | Galin et al. | 370/401 |

* cited by examiner

METHOD AND APPARATUS FOR DETERMINING UNMANAGED NETWORK DEVICES IN THE TOPOLOGY OF A NETWORK

BACKGROUND OF THE INVENTION

1. Field of the Invention

The present invention relates generally to network management systems and more particularly to a network management apparatus and method capable of determining the topology of a network.

2. Description of the Related Art

The following description is concerned with a data communications network, and in particular a local area network (LAN), but it will be appreciated that the present invention has more widespread applicability to other managed communications systems and networks including wide area networks (WANs) and wireless communications networks.

Data communications networks typically comprise a plurality of network devices (computers, peripherals and other electronic devices) capable of communicating with each other by sending and receiving data packets in accordance with predefined network protocols. Each network device is connected by at least one port to the network media, which in the case of a LAN network may be coaxial cable, twisted pair cable or fibre optic cable. Each device on the network typically has hardware for media access control (MAC) with its own unique MAC address. Data packets are sent and received in accordance with the MAC protocol (e.g. CSMA/CD protocol as defined by the standard IEEE 802.2, commonly known as Ethernet). Data packets transmitted using the MAC protocol identify the source MAC address (i.e. the MAC address of the device sending the data packet) and the destination MAC address (i.e. the MAC address of the device for which the data packet is destined) in the header of the data packet.

A network is generally configured with core devices having a plurality of ports, which can be used to interconnect a plurality of media links on the network. Such devices include hubs, repeaters, routers and switches which forward data packets received at one port to one or more of its other ports, depending upon the type of device. For example, a switch forwards a data packet, received at one port, only to a port known to be connected to the destination device specified in the data packet. Such core devices can either be managed or unmanaged.

A managed device is capable of monitoring data packets passing through its ports. For example, a managed device can learn the physical or MAC addresses of the devices connected to its ports by monitoring the source address of data packets passing through the respective ports. Identified source addresses transmitted from a port of a managed network device, such as a router, hub, repeater or switch, are stored in a respective "address table" associated with the port, as described further below.

Managed devices additionally have the capability of communicating using a management protocol such as the Simple Network Management Protocol (SNMP), as described in more detail below. Whilst the following description is concerned with the SNMP management protocol, the skilled person will appreciate that the invention is not limited to use with SNMP, but can be applied to managed networks using other network management protocols.

SNMP defines agents, managers and MIBs (where MIB is Management Information Base), as well as various predefined messages and commands for communication of management data. An agent is present in each managed network device and stores management data and responds to requests from the manager. A manager is present within the network management station of a network and automatically interrogates the agents of managed devices on the network using various SNMP commands, to obtain information suitable for use by the network administrator, whose function is described below. A MIB is a managed "object" database which stores management data obtained by managed devices and is accessible to agents for network management applications.

It is becoming increasingly common for an individual, called the "network administrator", to be responsible for network management, and his or her computer system or workstation is typically designated the network management station. The network management station incorporates the manager, as defined in the SNMP protocol, i.e. the necessary hardware, and software applications to retrieve data from MIBs by sending standard SNMP requests to the agents of managed devices on the network.

Network management software applications are known which attempt to determine the topology of a network, i.e. the devices on the network and how they are linked together. In order to determine the network topology, the application retrieves MIB data from the managed devices on the network, which can provide information about the devices connected to the managed devices, for instance the aforementioned "address tables". MIB data retrieved from managed devices can also provide information about device type, device addresses and details about the links. Using such data, the application can usually determine the topology of the entire network.

An example of a known network management software application capable of determining network topology is the 3Com Network Supervisor available from 3Com Corporation of Santa Clara, Calif., USA.

However, these network management systems are rarely able to determine the complete topology of the network, due to the presence of unmanaged network devices, and in particular, unmanaged or unsupported core or connecting network devices such as hubs and switches. In such cases the network map cannot depict the core network device correctly with its multiple ports and connections to other network devices.

The present invention seeks to address this problem.

SUMMARY OF THE INVENTION

In accordance with a first aspect, the present invention provides a method for determining the topology of a network when a network tree, built from data relating to discovered devices on the network, contains one or more unresolved branches, the method comprising: for each unresolved branch of the network tree, attempting to determine the type of each of the discovered network devices on the branch, and if the type of every discovered network device on the branch is determined to be an endstation type, inferring that an undiscovered connecting device is present on the branch.

Accordingly, the present invention enables the topology of the network to be resolved when an undiscovered connecting device, such as a switch or hub, is used solely to connect endstations, such as PCs and printers, to the network.

In a preferred embodiment, the inferred connecting device is created and represented on a network map or other graphical representation of the network topology. The network administrator is therefore presented with a clearer indication of the topology of the network.

In accordance with a second aspect, the present invention provides a computer readable medium having a computer program for carrying out the method in accordance with the first aspect of the present invention.

In accordance with a third aspect, the present invention provides a network management apparatus for determining the topology of a network, the apparatus comprising: a memory for receiving and storing data relating to discovered devices on the network; a processor, coupled to the memory, the processor configured to build a network tree using the received data, and, for each unresolved branch of the network tree, to attempt to determine the type of each of the discovered network devices on the branch; wherein, if the type of every discovered network device on an unresolved branch is determined to be an endstation type, the processor infers that an undiscovered connecting device is present on the branch.

Further preferred and optional features of the present invention will be apparent from the following description and accompanying claims.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 1:
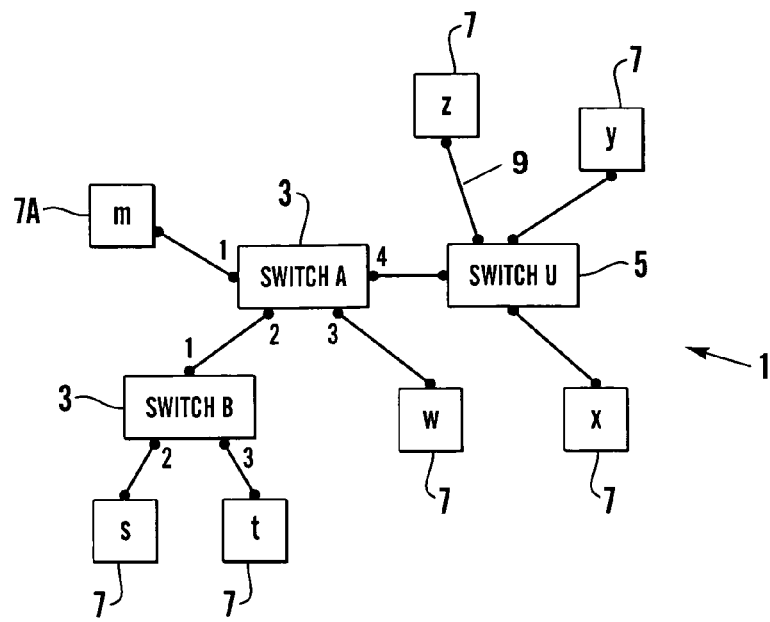
FIG. 1 is a block diagram of a typical network including a network management apparatus in accordance with an embodiment of the present invention.

FIG. 1 shows a typical network 1 incorporating a network management system for use in accordance with the present invention. The network 1 comprises managed switches 3 having identifiers A and B, unmanaged or unsupported switch 5 having identifier U, management station 7A, and endstations 7 having identifiers s, t, w, x, y and z, and media links 9, (only one of which is numerically referenced). The following description will refer to each network device with reference to its identifier which is typically its IP address, physical address or name.

Management station m is connected to port 1 of switch A; switch B is connected to port 2 of switch A; endstation w is connected to port 3 of switch A; and switch U is connected to port 4 of switch A. Endstation s is connected to port 2 of switch B and endstation t is connected to port 3 of switch B. Endstations x, y and z are connected to respective ports of switch U.

Network management station m incorporates the necessary hardware and software for network management. In particular, network management station m includes a processor, a memory and a disk drive as well as user interfaces such as a keyboard and mouse, and a visual display unit 11 (see FIG. 2). Network management application software in accordance with the present invention is loaded into the memory of management station m for processing data as described in detail below.

The network management station m is capable of communicating with the managed switches A and B by means of a network management protocol, in the present embodiment the SNMP protocol, in order to obtain network management data. In particular, the management station m includes the SNMP manager. Each managed device monitors data traffic passing through its ports and includes an SNMP agent which stores MIB data in memory on the device, as is well known in the art, and communicates such data to the SNMP manager in the network management station 7A, as described below.

The network management station m includes a network management software application which determines the topology of the network 1. The determination of the topology of the network is typically performed upon setting up/installing the network management application, and subsequently on command by the network administrator.

The topology of the network is typically determined by building a "network tree". In particular a network device or "node" is selected as a "root node" (which is typically a managed switch or bridge) and the system uses MIB data retrieved from the managed network devices to determine the identity of all the "child nodes" of each of the ports of a root node.

The child nodes of a given port are the devices, the addresses of which the port has learnt by monitoring the source addresses of data packets passing through the port. In other words, the child nodes are network devices which are connected on a "branch" of the network connected to the relevant port, and which have sent data packets to network devices on other branches of the network through the root device.

The process is then repeated for each of the child nodes, to determine which nodes are children of each child node, their orientation with respect to each other and thus the structure of the branch. This process builds up the "network tree". More details of the manner of determining network topology in this way can be found in RFC 2108 "Definitions of Managed Objects for IEEE 802.3 Repeater Devices using SMIv2", which is incorporated herein by reference.

Consider that the presence of switch U is recognised by the network management application, i.e. it has been discovered, but is unable to provide to the network management application data containing the addresses learnt by its ports. There are several reasons why this situation might arise. For instance, switch U may be unsupported (it cannot provide data in a format that the application can understand) or the network management application may not be authorised to access its data. The network management application is thus provided with the address table data indicated in Table 1 and Table 2 below.

TABLE 1

| Port of Switch A | Child nodes |
| --- | --- |
| A1 | m |
| A2 | B, s, t |
| A3 | w |
| A4 | U, x, y, z |

TABLE 2

| Port of Switch B | Child nodes |
| --- | --- |
| B1 | A, U, m, s, t, w, x, y, z |
| B2 | s |
| B3 | t |

In accordance with the prior art technique, the management application builds the network topology by selecting a root node and building a tree from the root node. Consider the case where switch A is the root node. Since switch B is the only other device with topology information (Table 2), and port 1 of switch B is facing the root device, switch A, it is possible to make endstations s and t child nodes of ports 2 and 3 of switch B respectively.

Thus, the topology tree is determined as shown in Table 3.

TABLE 3

| Port of root node | Child node(s) | Child of child node |
| --- | --- | --- |
| A1 | m | |
| A2 | B | |
| | B2 | s |
| | B3 | t |
| A3 | w | |
| A4 | U, x, y, z | |

Figure 2:
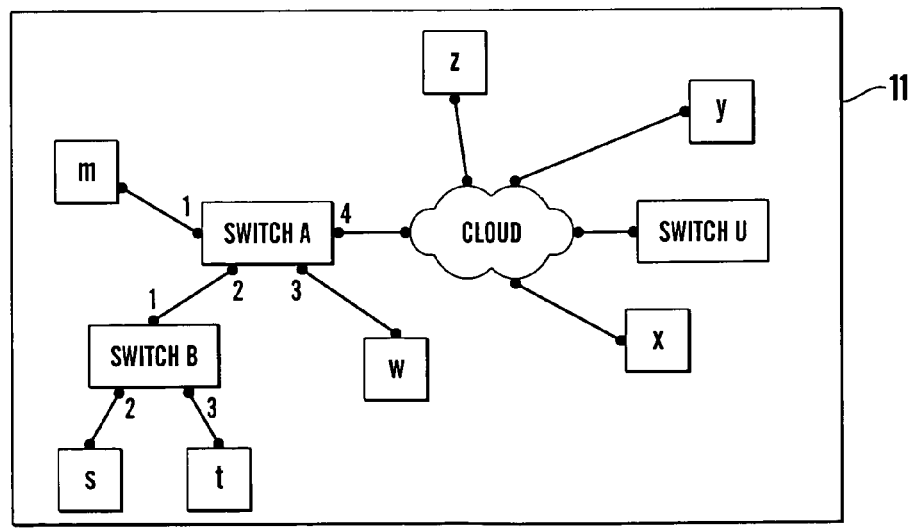
FIG. 2 illustrates a display screen displaying a map of the network of FIG. 1 determined in accordance with a prior art technique.

Since switch U does not provide topology information to the network management application, it is not possible to resolve the topology of the network for the branch connected to port 4 of switch A. Accordingly, in accordance with a prior art technique, the network topology may be presented as a network map having a cloud connected to port 4 of switch A and with the child nodes thereof connected to the cloud as shown in FIG. 2.

Consider now the situation in which switch U is an unmanaged device, and is not only unable to provide, to the network management application, data containing the addresses learnt by its ports, but also is not even discovered by the network management application. In this case, the topology determined will be as set out in Table 4 below. Table 4 is the same as Table 3 above except that switch U will not be included as a child of port 4 of switch A.

TABLE 4

| Port of root node | Child node(s) | Child of child node |
| --- | --- | --- |
| A1 | m | |
| A2 | B | |
| | B2 | s |
| | B3 | t |
| A3 | w | |
| A4 | x, y, z | |

Figure 3:
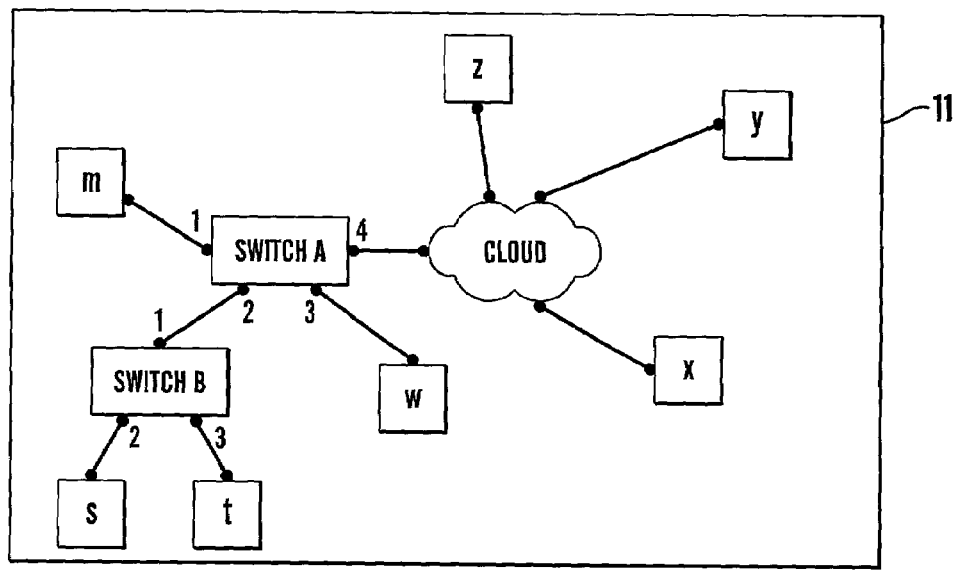
FIG. 3 illustrates a display screen displaying a map of the network of FIG. 1 determined in accordance with another prior art technique.

This is presented on the network map as shown in FIG. 3, in which a cloud is connected to port 4 of switch A, and devices x, y and z, but not U, are connected to the cloud.

As will be appreciated from the above, in the case of the switch U being either unsupported or unmanaged the topology presented in the network map to the network administrator does not represent the true topology of the network. The present invention seeks to determine when an unmanaged or unsupported core or connecting device is present and to represent this on the network map.

In accordance with the present invention, an unmanaged or unsupported core network device, which is not discovered by the network management application, is determined or inferred if a branch of the network includes a plurality of child nodes which are all known to be endstations (e.g. a UNIX workstation, PC, printer or other non-connecting network device). In order to determine whether the child nodes are endstations, the network management application must first have determined, as far as possible, the type of each of the discovered network devices connected on the unresolved branch.

Various methods may be used to determine that a device is an endstation. For example, UK Patent Application No 0009044.9 entitled "Discovering Non-Managed Devices in a Network such as a LAN using Telnet" describes a way for a network management application to determine the type of a network device it has discovered by emulating a Telnet client and reading the identification string in the Telnet Login banner provided by the network device. This method can be used to identify endstations such as UNIX workstations, printers and print servers.

The skilled person will appreciate that many different methods may be used to determine that discovered devices are endstations. For example, endstations running Windows can be detected using Windows API calls. Other device types such as file servers and IP printers may be determined using well-known protocols.

The network management application of the preferred embodiment of the present invention attempts to determine the type of each of the discovered devices, using appropriate combinations of the above described techniques, as part of the network discovery process, i.e. prior to determining the network topology. Once the discovery process has been completed, the network management application determines that there is an unmanaged or unsupported connecting device in an unresolved branch if all the child nodes in the branch are endstations. The network management application infers that a connecting device is present, to which all of the child nodes in the branch are connected.

In accordance with a preferred embodiment, the method of the present invention is implemented in the form of a software application which may be provided in the form of a computer program on a computer readable medium. Such computer readable medium may be a disk which can be loaded in the disk drive of network management station m or the computer system carrying a website of, for example the website of the supplier of network devices, which permits downloading of the program over the internet by a network management station. Thus the present invention may be embodied in the form of a carrier wave with the computer program carried thereon.

Figure 5:
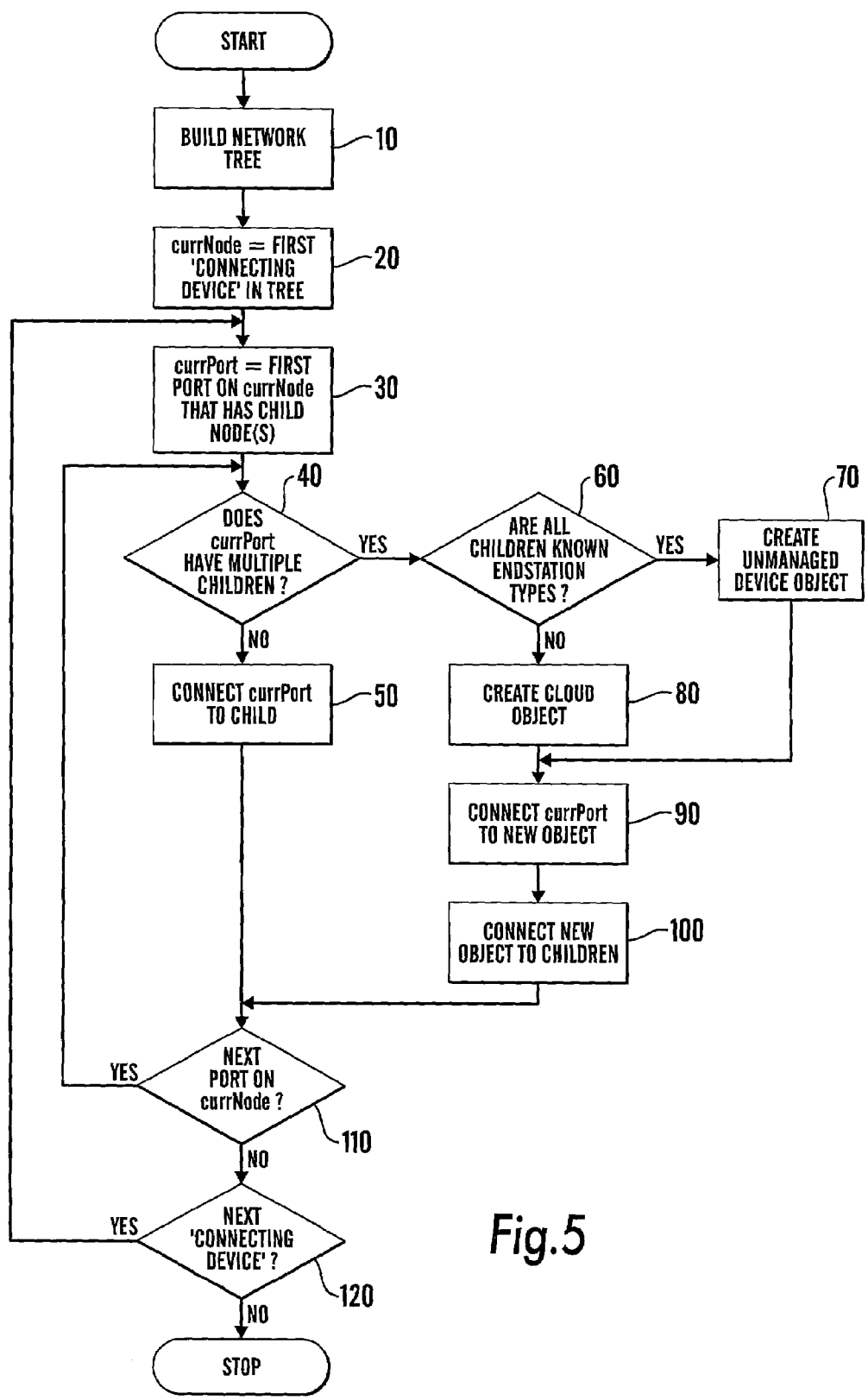
FIG. 5 is a flow diagram illustrating the steps performed by a computer program in accordance with a preferred embodiment of the present invention.

FIG. 5 illustrates the program steps performed by the computer program in accordance with the method of the preferred embodiment of the present invention. The program steps will be described initially, followed by specific examples of how the program resolves the topology of the network of FIG. 1 in the different situations described above.

The program starts once the discovery process has been completed as described above.

At step 10, the program builds a network tree, in accordance with the conventional method as described above.

At step 20, the program sets a Current Node variable "currNode" as the first connecting device in the tree. The first connecting device is the root node and is typically the managed/supported connecting device that is closest to the network management station.

At step 30, the program sets a Current Port variable "currPort" as the first port on the Current Node that has at least one child node.

At step 40, the program considers whether the Current Port has multiple children. If the Current Port does not have multiple children, the program continues with step 50 by connecting the Current Port to the child node.

The program then continues with step 110 by considering whether the Current Node has a further port that has at least one child node in the discovered topology. If step 110 determines that the Current Node does have a further port, the program sets the variable currPort to the number of next port present in the topology, in the present example A2, and returns to step 40. Alternatively, if step 110 determines that the Current Node does not have a further port, the program continues with step 120 by considering whether there are any further connecting devices in the determined topology. If step 120 determines that there are further connecting devices in the topology, the program sets the variable currNode to the next connecting device present in the topology, and returns to step 30.

Returning to step 40, if step 40 determines that the Current Port does have multiple children, the program continues with step 60. Step 60 considers whether all the children of the Current Port are known to be endstations. In particular, the program considers the type of each of the child nodes of the Current Port, as determined during the discovery process.

If all the child nodes are an endstation type, that is, step 60 determines that all the children of the Current Port are endstations, then the Current Port is assumed to be connected to an unmanaged connecting device which has not been discovered in the network topology, and the program continues by creating a new object, specifically an unmanaged device object, at step 70. The program then continues with step 90 by connecting the Current Port to the new object, and with step 100 by connecting the children of the Current Port to the new object.

If step 60 determines that not all the children of the Current Port are endstations, that is, at least one of the child nodes of the Current Port is a connecting device or unknown type, then, in the preferred embodiment, the topology of the branch of the network connected to the Current Port is not inferred, since one or more of the child nodes could be a discovered, but unsupported, connecting device. In accordance with the preferred embodiment, as depicted in FIG. 5, the program continues with step 80 by creating a new object, specifically a cloud object, and at step 90 connecting the Current Port to the new object, and continuing with step 100 by connecting the children of the Current Port to the cloud object and continues with step 110.

The program stops when step 120 determines that there are no further connecting devices to consider in the topology.

EXAMPLE 1

Applying the program of FIG. 5 to the network of FIG. 1, assume step 10 builds the network tree as shown in Table 4 above, that is, switch U is not discovered, for example because it is unmanaged, and thus not included in the network tree. In addition, assume that step 20 sets currNode to A, switch A being the closest managed device to the management station m.

Step 30 sets currPort to A1, this being the first port on the current node that has at least one child node. Step 40 determines that currPort A1 does not have multiple children, and the program continues with step 50 by connecting currPort A1 to the child node m.

The program then continues with step 110 by considering whether the Current Node has a further port that has at least one child node in the discovered topology. Step 110 determines that the currNode A does have a further port and sets the variable currPort to the number of next port present in the topology, in the present example currPort is set to A2.

The program returns to step 40, which determines that the currPort only has one child node, B, as shown in Table 4, and step 50 connects A2 to B. At step 110 the program moves on to node A3 which is similarly determined in step 40 to have only one child node w, which is connected to A3 in step 50.

When the program sets currPort to A4, step 40 now determines that A4 does have multiple children. These are x, y and z as shown in Table 4.

In this case, the program continues with step 60 by considering whether all the children of the Current Port are known to be endstations. In particular, step 60 determines the type of each of the child nodes x, y and z.

Since all the child nodes of A4 are determined to be of an endstation type during the discovery process as described above, step 60 determines that all the children of the currPort A4 are endstations. Accordingly, it is assumed that an unmanaged connecting device, that has not been detected in the discovery process, must be present. This, of course, is undiscovered Switch U shown in FIG. 1. Accordingly, step 70 creates an unmanaged device object representing U and then step 90 connects A4 to the new object. Step 100 then connects each of the child nodes of A4, which are endstations, to respective ports of the new object.

Since there are no further ports on currNode A, step 120 sets currNode to B, which is the next connecting device in the discovered topology. The program then proceeds in the same manner as for Switch A, and in particular, connects child node s to port B2 of Switch B and child node t to port B3 of Switch B. With no further connecting devices to consider, the program then ends.

Figure 4:
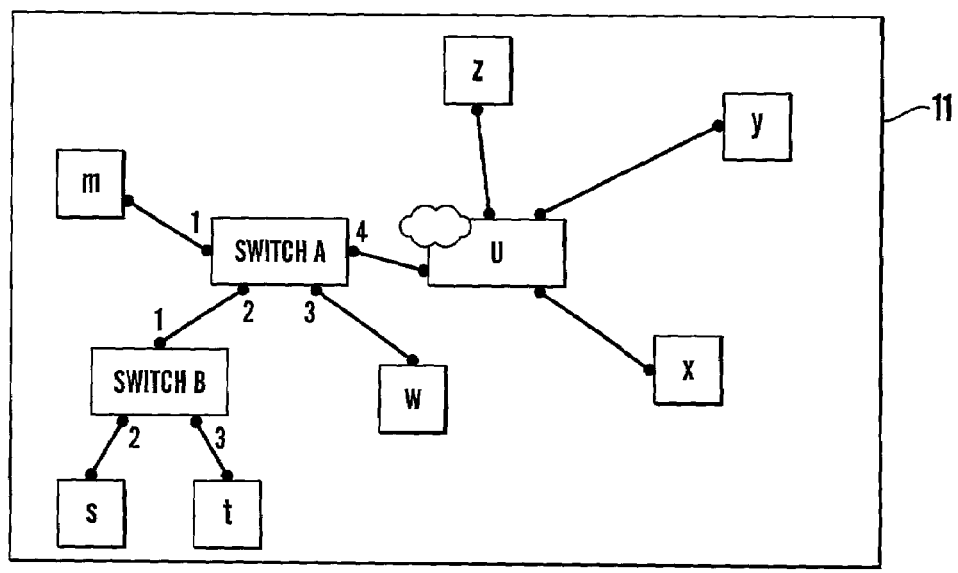
FIG. 4 illustrates a display screen displaying a map of the network of FIG. 1 determined in accordance with a preferred embodiment of the present invention.

Preferably, the network management station 7A displays, on its display screen, a network map to depict the thus determined topology as shown in FIG. 4. The inferred device U is represented in a similar manner to other connecting devices but with an additional symbol to indicated that its presence is inferred by the network management application. Thus, in FIG. 4, a cloud symbol is depicted, in a corner of the rectangular icon used to represent a connecting device. It will be appreciated that other manners of depiction are possible. For example, the icon may be simply labelled as inferred, or alternatively represented in dotted or dashed outline, or by a different colour to discovered connecting devices. In another embodiment, a unique icon may be used to represent an inferred connecting device.

EXAMPLE 2

Applying the program of FIG. 5 to the network of FIG. 1, assume step 10 builds the network tree as shown in Table 3 above, that is, switch U is discovered and included in the network tree, but because it is unsupported, the position of switch U in the topology cannot be resolved. Also assume that step 20 sets currNode to A, Switch A being the closest managed device to the management station m.

The program proceeds in the same manner as Example 1, until currPort A4. In this case, step 60 determines that not all the children of the Current Port are endstations, because discovered device U, the unsupported Switch shown in FIG.

1, is of unknown type. Thus, step 80 creates a new object, specifically a cloud object, step 90 connects A4 to the cloud object, and step 100 connects the child nodes U, x, y and z to the cloud object. The program then moves on to Switch B and proceeds as in Example 1.

Preferably, the network management station 7A displays, on its display screen, a network map to depict the thus determined topology as shown in FIG. 2.

As the skilled person will appreciate, various modifications and changes may be made to the described embodiments. It is intended to include all such variations, modifications and equivalents which fall within the spirit and scope of the present invention as defined in the accompanying claims.

The invention claimed is:

1. A method for determining the topology of a network when a network tree, built from data relating to discovered devices of the network, includes one or more unresolved branches, the method comprising:

for each unresolved branch of the network tree, attempting to determine the type of each of the discovered network devices on the branch, if the type of each discovered network device on the branch is determined to be an endstation type, inferring that an undiscovered connecting device is present on the branch;

if the type of at least one discovered network device on the branch is not an endstation type, leaving the topology of the branch unresolved; and presenting the determined network topology as a network map, the map comprising icons representing network devices and lines representing network links, wherein the inferred connecting device is represented differently from a discovered connecting device.

2. The method as claimed in claim 1 wherein, if an undiscovered network device is inferred to be present on a branch, the method further comprises the step of:

resolving the topology of the branch by determining that the discovered network devices on the branch are connected to respective ports of the inferred connecting device.

3. The method as claimed in claim 1 wherein the received data comprises address table data for the ports of one or more managed connecting devices on the network, the address table data including the identity of each said port and the identity of other network devices which the port has learned.

4. The method as claimed in claim 3 further comprising the steps, in building the network tree, of selecting a discovered connecting device as a root node, and building a data representation of the tree from the root node, the data representation comprising at least one branch from a respective port of the root node, each branch comprising the identity of the port and the identity of at least one child node on the branch.

5. The method as claimed in claim 4 wherein, after building the network tree, the method comprises the step of:

determining whether the topology of one or more branches of the tree is unresolved.

6. The method as claimed in claim 5 wherein the step of determining whether the topology of one or more branches of the tree is unresolved comprises the steps of:

a) selecting a port of the root mode;

b) considering whether the branch from the selected port has more than one child node, and c) if the branch from the port has more than one child node, determining that the branch is unresolved.

7. The method as claimed in claim 6 further comprising the step of repeating steps a), b) and c) for each port of each discovered connecting device.

8. The method as claimed in claim 1 wherein the network tree is built using the steps of:

receiving data relating to discovered devices on the network, and using the received data to build a network tree.

9. A computer readable medium including a computer program for determining the topology of a network when a network tree, built from data relating to discovered devices of the network, includes one or more unresolved branches, the program comprising the steps of:

attempting to determine the type of each of the discovered network devices on an unresolved branch of the network tree;

inferring that an undiscovered connecting device is present on the unresolved branch if the type of each discovered network device on the branch is determined to be an endstation type;

if at least one discovered network device on the unresolved branch is determined not to be an endstation type, leaving the topology of the branch unresolved; and presenting the determined network topology as a network map, the map comprising icons representing network devices and lines representing network links, wherein the inferred connecting device is represented differently from a discovered connecting device.

10. A network management apparatus for determining the topology of a network, the apparatus comprising;

a memory for receiving and storing data relating to discovered devices on the network;

a processor, coupled to the memory, the processor configured to build a network tree using the received data, and, for each unresolved branch of the network tree, to attempt to determine the type of each of the discovered network devices on the branch;

wherein, if the type of every discovered network device on an unresolved branch is determined to be an endstation type, the processor infers that an undiscovered connecting device is present on the branch, and if at least one discovered network device on the unresolved branch is determined not to be an endstation type, the processor does not infer the topology of the unresolved branch of the network; and means for presenting a network map showing the determined topology of the network selected from the group consisting of a display and a printer.

* * * * *